Feb. 4, 1930.                 H. S. BALDWIN                 1,746,181
                         VEHICLE VENTILATING SYSTEM
                            Filed Nov. 18, 1926
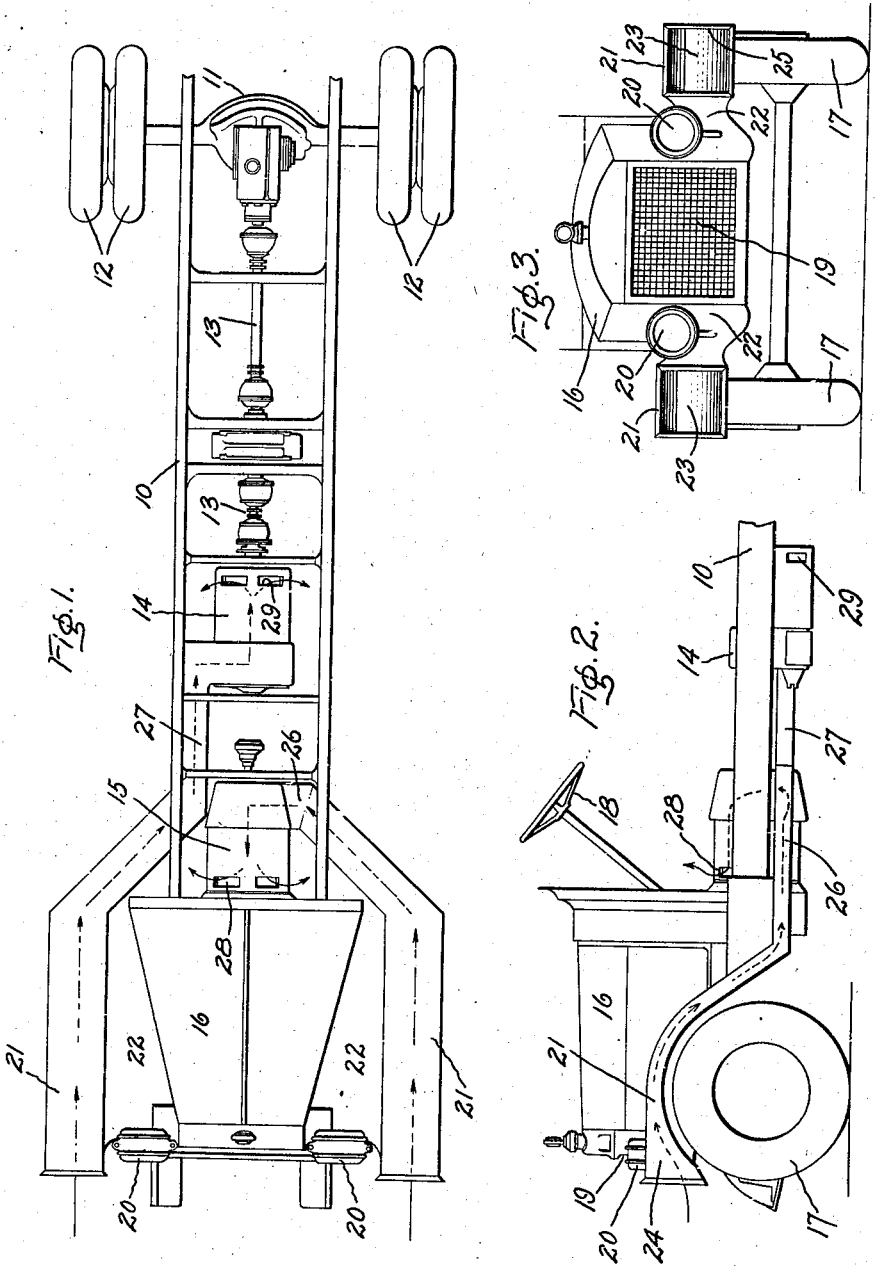
Inventor:
Henry S. Baldwin,
by
    His Attorney.

Patented Feb. 4, 1930

1,746,181

UNITED STATES PATENT OFFICE

HENRY S. BALDWIN, OF SWAMPSCOTT, MASSACHUSETTS, ASSIGNOR TO GENERAL ELECTRIC COMPANY, A CORPORATION OF NEW YORK

VEHICLE VENTILATING SYSTEM

Application filed November 18, 1926. Serial No. 149,256.

This invention relates to ventilating systems for motor vehicles and has for its object the provision of a structure such that cool, clean air will be supplied at all times to the part of the vehicle through which air is circulated.

A further object of the invention is to provide air supply ducts for the system of such form that they may be applied to the vehicle without impairing its general appearance and at the same time arrange the air intake to the ducts in such part of the vehicle that a cool clean supply of air will be insured.

The invention will be more clearly understood from the following description taken in connection with the accompanying drawings in which Fig. 1 is a plan view of the vehicle chassis with the ventilating system applied thereto, the steering wheel shown in Fig. 2 being omitted; Fig. 2 is a side elevation of the left-hand portion of the structure of Fig. 1; and Fig. 3 is a front view of the vehicle.

The frame of the vehicle 10 is supported at the rear end by the ordinary form of rear axle shaft housing 11, on which are mounted the driving wheels 12. The driving wheels are connected through shafts and gearing within this housing (not shown) to a propelling means comprising shafts 13, an electric motor 14, and an electric generator 15, which are mounted on the frame 10.

The electric current for driving the motor is supplied from the generator 15 through conductors connecting them (not shown) and the generator is driven by a suitable engine (not shown) under hood 16.

The forward portion of the vehicle is carried by wheels 17 which are controlled by the usual steering wheel 18, the connecting and supporting mechanism not being shown as it forms no part of my invention.

At the forward part of the hood 16 is a radiator or air inlet screen 19 for cooling the engine and the usual lamps 20 are arranged at the sides thereof.

The fenders 21 for the front wheels of the vericle are supported along their edges 22 on the frame 10 and are formed with air ducts 23 therein which extend over the front wheels and the entire length of the fenders, as indicated by the dotted arrows. The air ducts are flared at their forward ends as shown at 24 to form enlarged air inlet openings 25 directed forwardly of the vehicle so as to facilitate the flow of air into the same. The portion of the ducts extending toward the rear of the vehicle are made thin, in comparison to their width, so that the fender, when applied to the vehicle, will have its usual appearance. If desired, for the sake of improved appearance, the forward flared portions 24 may be omitted. It is of advantage, however, to employ the flared portions as air will be forced at a greater rate through the ducts upon forward motion of the vehicle, than when they are not employed.

The fenders 21 have extension ducts 26 and 27, the former conducting air to the generator 15, the latter extending to the motor 14. Air passing through the fenders, to the motor and generator, is discharged through openings 29 and 28 respectively. It is obvious that I may employ fans attached to the rotor of the generator or motor to assist in the circulation of air through the system.

In operation of the system herein disclosed, the generator 15 supplies current to the motor 14 which drives the vehicle through the shafts 13, housing 11 and rear wheels 12. The generator and motor become heated, air is drawn into the conduits 23 and directed through the extensions 26 and 27 to the generator 15 and motor 14, circulated therethrough for cooling and discharged through openings 28 and 29 respectively.

From the foregoing description it is clear that I have provided a construction which supplies a clean, cool stream of air for the system. The conduits for supplying air are relatively remote from any heated part of the vehicle and the inlet openings are at the forward portion, so that preheating of the cooling air and the taking in of dust raised in operating the vehicle will be avoided.

I desire it to be understood that my invention is not limited to the particular arrangement shown and described and I aim in the appended claims to cover all modifications which do not depart from the spirit and scope of my invention.

What I claim as new and desire to secure by Letters Patent of the United States, is:—

1. In an electrically driven vehicle, an electric generator and an electric motor operatively connected to drive said vehicle, fenders on said vehicle, one of said fenders having an air duct communicating with said generator and another of said fenders having an air duct communicating with said motor to cool the same.

2. In an electrically driven vehicle, an electric generator and an electric motor operatively connected to drive said vehicle, fenders on said vehicle provided with air ducts conforming with the shape of said fenders, said ducts having inlets adjacent their forward ends and extensions adjacent their rearward portions, one of the extensions communicating with said motor and the other communicating with said generator to cool the same.

3. In a wheeled vehicle, means for propelling the vehicle, fenders for the front wheels of the vehicle, said fenders being formed with air ducts extending over the front wheels and having openings at the front ends thereof, and extensions on said ducts for directing cooling air to the propelling means.

4. In a wheeled vehicle, means for propelling the vehicle, fenders for the front wheels of the vehicle, said fenders being formed with air ducts extending over the front wheels and having openings at the front ends thereof, said ducts extending the entire length of said fenders, and extensions on said ducts for directing cooling air to the propelling means.

In witness whereof, I have hereunto set my hand this tenth day of November, 1926.

HENRY S. BALDWIN.